US009929966B2

(12) United States Patent
Nakakes et al.

(10) Patent No.: US 9,929,966 B2
(45) Date of Patent: Mar. 27, 2018

(54) PRESERVATION OF A TTL PARAMETER IN A NETWORK ELEMENT

(71) Applicants: Tintooda Nakakes, Plano, TX (US); Albert V. Smith, Richardson, TX (US); Nasir Iqbal Amanullah, Plano, TX (US); Joseph Nguyen, Flower Mound, TX (US); Xinxin Sun, Allen, TX (US)

(72) Inventors: Tintooda Nakakes, Plano, TX (US); Albert V. Smith, Richardson, TX (US); Nasir Iqbal Amanullah, Plano, TX (US); Joseph Nguyen, Flower Mound, TX (US); Xinxin Sun, Allen, TX (US)

(73) Assignee: Fujitsu Limited, Kawasaki (JP)

( * ) Notice: Subject to any disclaimer, the term of this patent is extended or adjusted under 35 U.S.C. 154(b) by 215 days.

(21) Appl. No.: 14/590,826

(22) Filed: Jan. 6, 2015

(65) Prior Publication Data
US 2015/0271084 A1    Sep. 24, 2015

Related U.S. Application Data

(60) Provisional application No. 61/969,000, filed on Mar. 21, 2014.

(51) Int. Cl.
| H04L 12/841 | (2013.01) |
| H04L 12/721 | (2013.01) |
| H04L 29/06 | (2006.01) |
| H04L 12/801 | (2013.01) |

(52) U.S. Cl.
CPC ............ *H04L 47/286* (2013.01); *H04L 45/26* (2013.01); *H04L 47/34* (2013.01); *H04L 69/161* (2013.01)

(58) Field of Classification Search
CPC . H04L 45/00; H04L 29/0653; H04L 49/3009; H04L 47/10; H04L 29/06
See application file for complete search history.

(56) References Cited

U.S. PATENT DOCUMENTS

| 7,480,292 | B2* | 1/2009 | Busi ....................... H04L 45/16 370/389 |
| 8,867,545 | B2* | 10/2014 | Viens .................... H04L 45/502 370/392 |
| 2004/0001486 | A1* | 1/2004 | Ozguner ................. H04L 69/22 370/389 |
| 2008/0205400 | A1* | 8/2008 | Ramalho ................. H04L 47/10 370/392 |
| 2014/0328343 | A1* | 11/2014 | Kapadia ................ H04L 45/741 370/392 |
| 2015/0003452 | A1* | 1/2015 | Skriver .................. H04L 45/74 370/392 |
| 2015/0244617 | A1* | 8/2015 | Nakil ..................... H04L 43/04 709/224 |

* cited by examiner

*Primary Examiner* — Mark Rinehart
*Assistant Examiner* — Sanjay K Dewan
(74) *Attorney, Agent, or Firm* — Baker Botts L.L.P.

(57) ABSTRACT

In a system having multiple internal Internet protocol (IP) stacks, such as a network element, a value of a time-to-live (TTL) parameter may not be changed by an ingress IP stack. An indication of internal forwarding within the system may be used. An egress IP stack may decrement the value of the TTL parameter. A public network address for the system may be used for response packets to diagnostic packets received by the system.

15 Claims, 4 Drawing Sheets

PRESERVATION OF A TTL PARAMETER IN A NETWORK ELEMENT

CROSS-REFERENCE TO RELATED APPLICATION

This application claims priority from U.S. Provisional Application No. 61/969,000 filed Mar. 21, 2014, entitled "MANIPULATION OF TTL IN A MULTIPLE IP STACK SYSTEM IN A DISTRIBUTED ARCHITECTURE".

BACKGROUND

Field of the Disclosure

The present disclosure relates to communication networks, and more specifically, to preservation of a time-to-live (TTL) parameter in a network element.

Description of the Related Art

A communication network may include network elements that route packets through the network. Some network elements may include a distributed architecture, wherein packet processing may be distributed among several sub-systems of the network element (e.g., line cards). Thus, network elements may be modular and may include various sub-systems and/or sub-elements, which may include a shelf, a slot, a port, a channel and/or various combinations thereof.

Network elements may use multiple IP stacks in a distributed architecture system and the IP stacks may operate independently. The use of multiple IP stacks may result in certain errors or undesired behavior when tracing packets, such as with a trace route application, where duplicated responses or an incorrect count of a number of hops by a packet may be observed. Such errors may occur because a packet's time-to-live parameter (TTL), which is an internal packet parameter, may become decremented more than once on a single system, which may not correspond to an expected modification of TTL.

Also, an IP stack in a distributed architecture system, such as a network element, may use private or other internal IP addresses to communicate among distributed entities within the system. The internal IP addresses may generally be prevented from being visible from outside the distributed architecture system at the network element. In certain instances, applications such as the trace route application may expose the internal IP addresses externally to the network elements.

SUMMARY

In one aspect, a disclosed method is for preserving time-to-live (TTL) parameters in systems having multiple internal Internet protocol (IP) stacks. The method may include receiving an IP packet at an ingress IP stack in a system executing a plurality of IP stacks, including the ingress IP stack. The method may also include, based on destination information in the IP packet, determining a subsequent IP stack included in the plurality of IP stacks to forward the IP packet to. Responsive to determining the subsequent IP stack, the method may include setting an indication of internal routing in the IP packet. A value of a TTL parameter in the IP packet may not be changed by the ingress IP stack. The method may include forwarding the IP packet, including the indication of internal routing, to the subsequent IP stack. When the subsequent IP stack is an egress IP stack in the system, the method may further include clearing the indication of internal routing in the IP packet, decrementing the value of the TTL parameter in the IP packet, and forwarding the IP packet to a destination external to the system.

Additional disclosed aspects include a network element for preserving time-to-live (TTL) parameters, and an article of manufacture including computer readable media storing instructions executable by a processor for preserving time-to-live (TTL) parameters, as described herein.

BRIEF DESCRIPTION OF THE DRAWINGS

For a more complete understanding of the present invention and its features and advantages, reference is now made to the following description, taken in conjunction with the accompanying drawings, in which.

DESCRIPTION OF PARTICULAR EMBODIMENT(S)

Figure 1:
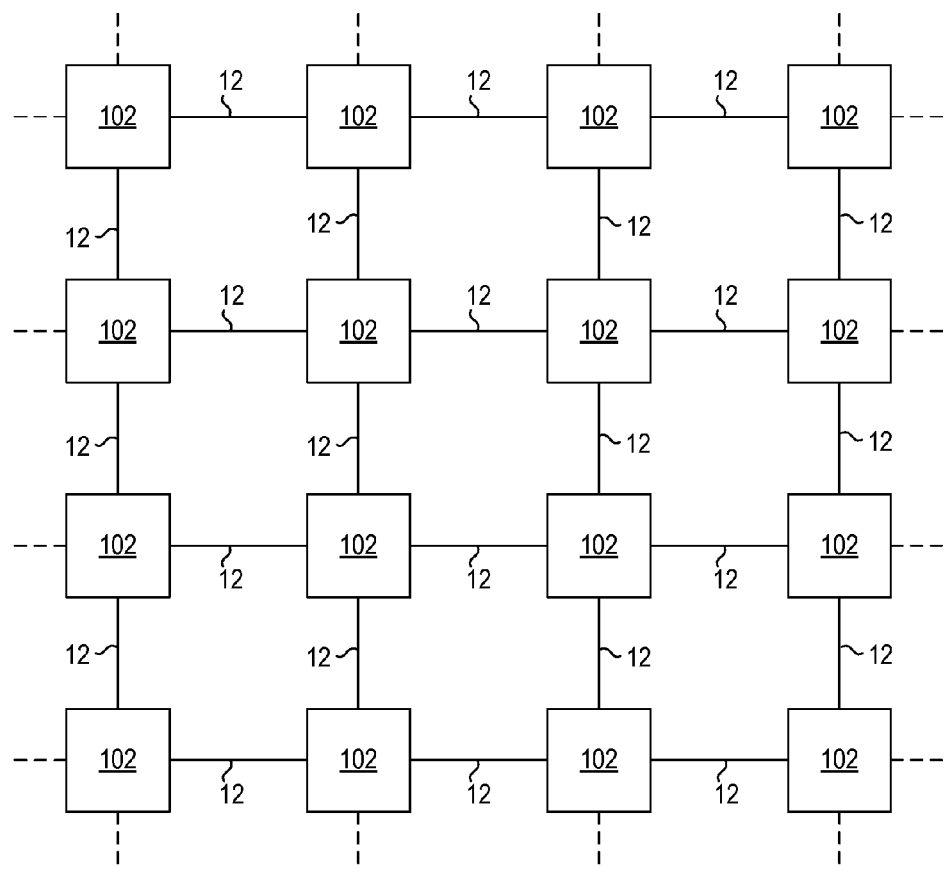
FIG. 1 is a block diagram of selected elements of a network for preserving time-to-live (TTL) parameters, in accordance with some embodiments of the present disclosure.

In the following description, details are set forth by way of example to facilitate discussion of the disclosed subject matter. It should be apparent to a person of ordinary skill in the field, however, that the disclosed embodiments are exemplary and not exhaustive of all possible embodiments.

As used herein, a hyphenated form of a reference numeral refers to a specific instance of an element and the un-hyphenated form of the reference numeral refers to the collective or generic element. Thus, for example, device "12-1" refers to an instance of a widget class, which may be referred to collectively as devices "12" and any one of which may be referred to generically as a device "12".

Referring now to the drawings, FIG. 1 is a block diagram showing selected elements of an embodiment of a network 100 for preservation of a time-to-live (TTL) parameter in a network element, in accordance with embodiments of the present disclosure. In certain embodiments, network 100 may be an Ethernet network. Network 100 may include one or more transmission media 12 operable to transport one or more signals communicated by components of network 100. The components of network 100, coupled together by transmission media 12, may include a plurality of network elements 102. In the illustrated network 100, each network element 102 is coupled to four other nodes. However, any suitable configuration of any suitable number of network elements 102 may create network 10. Although network 100 is shown as a mesh network, network 100 may also be configured as a ring network, a point-to-point network, or any other suitable network or combination of networks. Network 10 may be used in a short-haul metropolitan network, a long-haul inter-city network, or any other suitable network or combination of networks.

Each transmission medium 12 may include any system, device, or apparatus configured to communicatively couple network devices 102 to each other and communicate information between corresponding network devices 102. For example, a transmission medium 12 may include an optical fiber, an Ethernet cable, a T1 cable, a WiFi signal, a Bluetooth signal, and/or other suitable medium.

Network 100 may communicate information or "traffic" over transmission media 12. As used herein, "traffic" means information transmitted, stored, or sorted in network 100. Such traffic may comprise optical or electrical signals configured to encode audio, video, textual, and/or any other suitable data. The data may also be transmitted in a synchronous or asynchronous manner, and may be transmitted deterministically (also referred to as 'real-time') and/or stochastically. In particular embodiments, traffic may be communicated via a suitable communications protocol, including, without limitation, the Internet Protocol (IP). Additionally, the traffic communicated via network 100 may be structured in any appropriate manner including, but not limited to, being structured in frames, packets, or an unstructured bit stream.

Each network element 102 in network 100 may comprise any suitable system operable to transmit and receive traffic. In the illustrated embodiment, each network element 102 may be operable to transmit traffic directly to one or more other network elements 102 and receive traffic directly from the one or more other network elements 102. Network elements 102 will be discussed in more detail below with respect to FIG. 2.

Modifications, additions, or omissions may be made to network 100 without departing from the scope of the disclosure. The components and elements of network 100 described may be integrated or separated according to particular needs. Moreover, the operations of network 100 may be performed by more, fewer, or other components.

Network elements 102 may appear as a single entity via external interfaces, but may include multiple instances of network software, for example, IP stacks, that operate as multiple routing elements within the network element. In such cases, the TTL parameter in a field of incoming packets at a network element may be incorrectly processed and may result in reporting of internal information to external interfaces.

In general, IP forwarding may operate based on a hop-to-hop basis, which refers to individual network nodes that a given IP packet is forwarded across. The time-to-live (TTL) parameter may be used to limit a time that a given IP packet is forwarded in an IP network. However, instead of a clock time, the TTL parameter may be prescribed using a number of IP forwarding events or "hops". In this manner, the TTL parameter may function as an upper bound to an amount of time that a given IP packet may exist within an IP network.

Initially, when the IP packet is generated, a source node (as specified in a source field of the IP packet) may first send the IP packet out with a value for the TTL parameter corresponding to a maximum number of hops that the packet can traverse. In some embodiments, a default value for the TTL parameter is 64. Each subsequent network node in the IP network that receives the packet may decrement the value for the TTL parameter in the IP packet by 1 before retransmitting the IP packet to a next network node in the process of IP forwarding along a prescribed forwarding route in the IP network. When the IP packet reaches the destination node specified in the IP packet (in a destination field of the IP packet) with a non-zero value for the TTL parameter, the IP packet may be accepted by the destination node.

However, when the TTL parameter in an IP packet reaches zero before arriving at the destination node specified in the IP packet, a next IP network node receiving the IP packet may discard the IP packet. The IP network node that discards the IP packet due to the TTL parameter being zero may also send an Internet Control Message Protocol (ICMP) error packet back to the sender of the IP packet as notification of the discarded packet.

For purposes of tracking IP packets and performing network diagnostics, various tools and applications may be used. One network diagnostic tool is called trace route, which may be invoked by a traceroute command (also known as the commands tracert, traceroute(8), traceroute6, tracert6). Trace route is a standard application that traces a route in terms of hops that an IP packet traverses on a given forwarding path from a source node to a destination node. Trace route may send successive packets with an increasing value of the TTL parameter, beginning with a value of 1, in order to cause the sent packets to be dropped and to receive a corresponding ICMP error message from each successive network node that drops the packet. Trace route may continue sending packets with incremented values for the TTL parameter until the packets reach the destination node. By using the information in the ICMP error messages that arrive back, trace route may generate a routing map with timing information for a route between the source node and the destination node.

Because of the utility of trace route and similar tools for various types of network diagnostics, network 100 may be an IP network and may represent an environment where diagnostic tools, such as trace route, among others, are used by various stakeholders and participants. Accordingly, network elements 102 may be expected to operate as a unitary network node for routing purposes in network 100. Network elements 102 may further be expected to be able to be properly monitored by diagnostic tools such as trace route.

However, as mentioned, network elements 102 may internally employ a distributed architecture that includes multiple IP stacks at different internal nodes within network element 102. For example, network element 102 may include a main network element processor, as well as a plurality of network interface processors, each having a respective memory and enabled to execute a different IP stack (see also FIG. 2). Thus, various different internal nodes within network element 102 may each execute an independent IP stack. As a result of the multiple IP stacks, network element 102 may externally appear as multiple network nodes that each respond independently to the external network. For example, although network element 102 may be expected to perform IP forwarding with a single hop, the standard IP stack processing from the multiple IP stacks included in network element 102 may result in network element 102 decrementing the value of the TTL parameter multiple times for an IP packet being forwarded by network element 102, as the IP packet traverses the multiple IP stacks within network element 102. In certain embodiments, such IP forwarding behavior may result in certain packets being erroneously dropped, for example, when the value for the TTL parameter is too small to enable forwarding through the IP stacks in network element 102. Furthermore, various packet responses from the multiple IP stacks, such as ICMP error messages, among others, may use internal IP addresses in source or destination fields, thereby causing internal information from network element 102 to be externally divulged, which may be undesirable. Furthermore, network diagnostic tools, such as trace route, may not function as intended with network element 102 due to the multiple IP stacks within network element 102, which may cause confusing and incorrect responses from such diagnostic tools and may render network element 102 undesirable for operation within network 100.

As will be described in further detail, the inventors of the present disclosure have ascertained that, from other nodes in network 100 external to network element 102, network element 102 may be expected to appear as a single network node with a single IP stack, and that it may be desirable to make the multiple IP stacks within the network element appear as a single IP stack, when accessed externally.

In operation, as will be described in further detail herein, network element 102 may be modified to decrement a value for the TTL parameter exactly once for each received IP packet, irrespective of a number of hops that each IP packet undergoes within network element 102.

Figure 2:
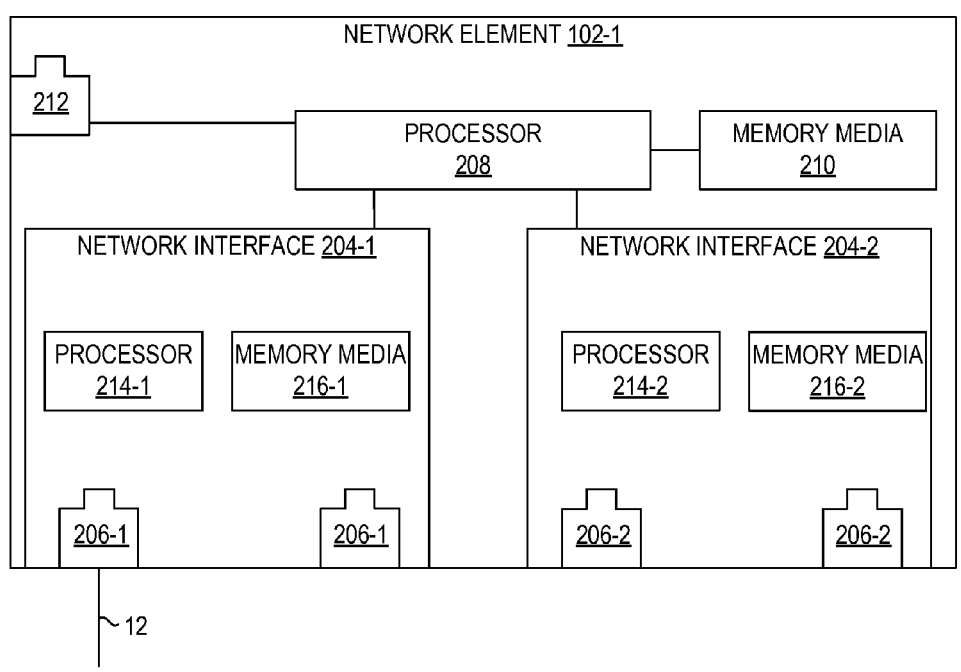
FIG. 2 is a block diagram of selected elements of a network element for preserving time-to-live (TTL) parameters, in accordance with some embodiments of the present disclosure.

Referring now to FIG. 2, a block diagram is illustrated of selected elements of an embodiment of network element 102-1 for preservation of a time-to-live (TTL) parameter, in accordance with embodiments of the present disclosure. Network element 102-1 is represented as a particular embodiment of network elements 102 for descriptive purposes. Network element 102-1, as shown, includes processor 208 and memory media 210, and external port 212, along with network interface 204-1 having ports 206-1 and network interface 204-2 having ports 206-2. External port 212 may be used by processor 208 to communicate with neighbor network elements (see FIG. 1).

As depicted in FIG. 2, each network element 102 may include processor 208 and memory media 210 that may store instructions executable by processor 208. As shown, memory media 210 may represent volatile, non-volatile, fixed, and/or removable media, and may be implemented using magnetic and/or semiconductor memory. Memory media 210 is capable of storing instructions (i.e., code executable by processor 208) or data. Memory media 210 or at least a portion of contents of memory media 210 may be implemented as an article of manufacture comprising non-transitory computer readable memory media storing processor-executable instructions. Memory media 210 may store instructions including an operating system (OS), which may be any of a variety of operating systems, such as a UNIX variant, LINUX, a Microsoft Windows® operating system, or a different operating system.

In FIG. 2, network elements 102 are shown including at least one network interface 204, which provides a plurality of ports 206 that receive a corresponding transmission media 12 (see also FIG. 1). Ports 206 and transmission media 12 may represent galvanic or optical network connections or combinations thereof. Each network interface 204 may include any suitable system, apparatus, or device configured to serve as an interface between a network element 102 and transmission medium 12. Each network interface 204 may enable its associated network element 102 to communicate with other network elements 102 using any of a variety of transmission protocols or standards. Network interface 204 and its various components may be implemented using hardware, software, or any combination thereof. In certain embodiments, network interfaces 204 may include a network interface card. In various embodiments, network interfaces 204 may include a line card. Each port 206 may include a system, device or apparatus configured to serve as a physical interface between corresponding transmission medium 12 and network interface 204. In some embodiments, port 206 may comprise an Ethernet port. Although in FIG. 2 network interfaces 204 are shown with 2 instances of ports 206 for descriptive clarity, in different embodiments, network interfaces 204 may be equipped with different numbers of ports 206 (e.g., 4, 6, 8, 16 ports, etc.).

As shown in FIG. 2, network interfaces 204 may include respective processors 214 and memory media 216, which may store and execute instructions and may be implemented in a similar manner as described above with respect to processor 208 and memory media 210, respectively. In various embodiments, processors 214 may execute internal instructions and operations, such as for packet routing and forwarding, and may be under control or supervision of processor 208.

In various embodiments, network element 102 may be configured to receive data and route such data to a particular network interface 204 or port 206 based on analyzing the contents of the data or based on a characteristic of a signal carrying the data (e.g., a wavelength or modulation of the signal). In certain embodiments, network element 102 may include a switching element that may include a switch fabric (SWF).

As shown, network element 102-1 may instantiate multiple instances of a network stack, which may be an IP stack. For example, memory media 210 may store instructions instantiating a first IP stack, memory media 216-1 may store instructions instantiating a second IP stack, and memory media 216-2 may store instructions instantiating a third IP stack. Each instance of the IP stack may decrement the value of a TTL parameter of an IP packet traversing through network element 102-1. As a result, the value of the TTL parameter for the IP packet may be decremented multiple times as the IP packet traverses within network element 102-1, which may be undesirable for various reasons, as explained above.

In operation of network element 102-1, as described in further detail herein, the multiple IP stacks in network element 102-1 may forward IP packets and respond to external IP packets as a single IP stack, as perceived from an external entity, such as a network administrator or another entity performing network diagnostics.

Figure 3:
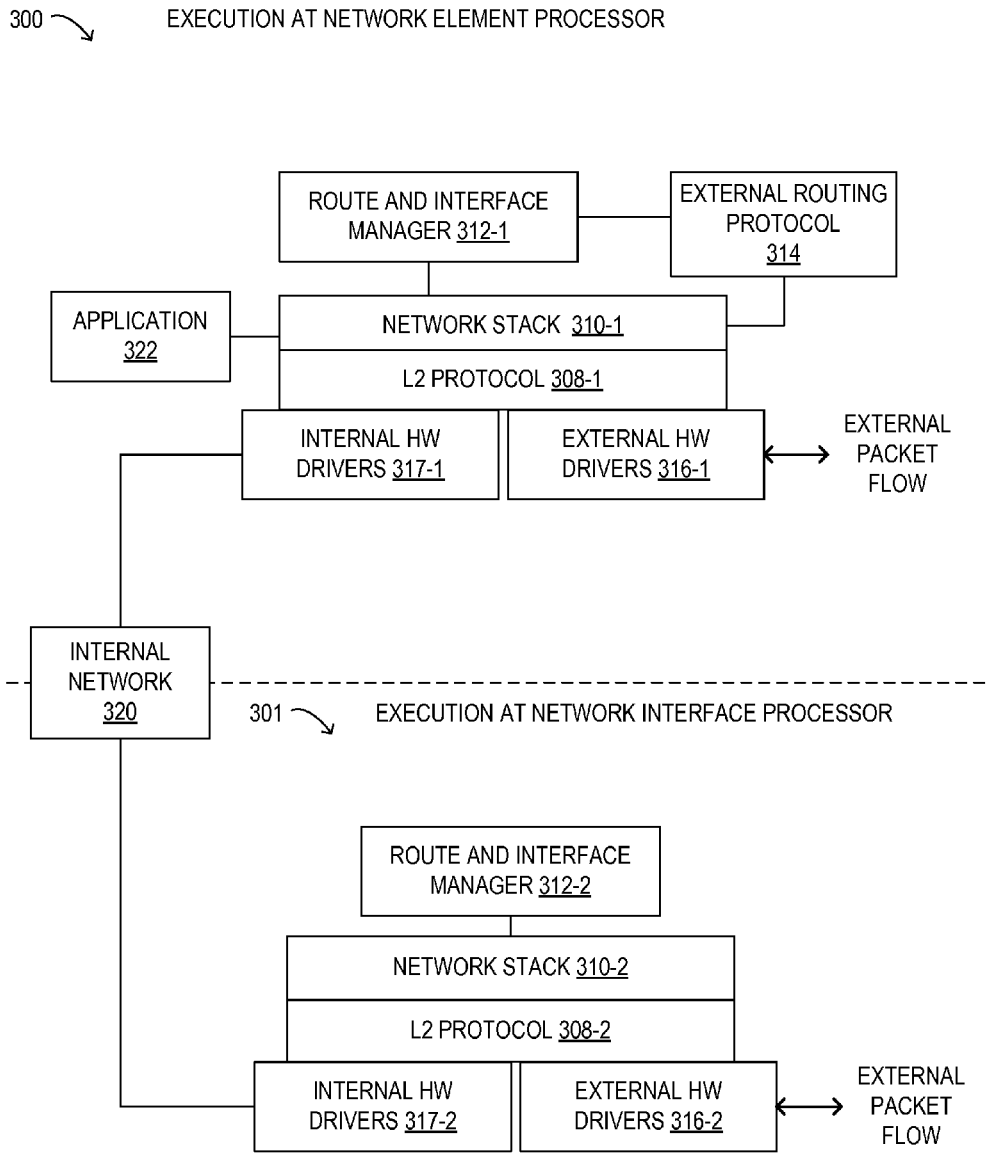
FIG. 3 is a block diagram of selected elements of a network architecture for preserving time-to-live (TTL) parameters in a network element, in accordance with some embodiments of the present disclosure.

Referring now to FIG. 3, a diagram depicts selected elements of an embodiment of a network architecture for execution on a network element, such as network element 102 in network 100 (see FIGS. 1 and 2). Specifically, in FIG. 3, network architecture 300 illustrates execution at a network element processor, such as processor 208 (see FIG. 2), while network architecture 301 illustrates execution at a network interface processor, such as processor 214 (see FIG. 2), for preservation of a time-to-live (TTL) parameter in a network element, in accordance with embodiments of the present disclosure. It is noted that although network architecture 300 is shown with one instance of network architecture 301, it will be understood that network architecture 301 may be replicated for multiple instances of network interfaces 204 included within network element 102.

In FIG. 3, network architecture 300 is shown including modules or code elements that may be executed at a network element processor having access to memory media. In one embodiment, network architecture 300 represents a collection of executable instructions stored in memory media 210 and executed by processor 208 (see FIG. 2).

In network architecture 300 of FIG. 3, application 322 may represent a top level application, such as a user interface, along with other associated programs and related data, which may serve as a source or a sink for packets processed by a network element. Examples of application 322 include telnet, ftp, SNMP, among others, which represent tools for managing a network element, including functionality for activation, monitoring, alarm handling, statistical analyses of performance and other operational characteristics. Other examples of application 322 include a control plane protocol, and code to instantiate a software-defined network (SDN), such as using an OpenFlow SDN protocol or another SDN protocol.

As shown in network architecture 300 of FIG. 3, route and interface manager 312-1 may operate to facilitate internal routing within the network element and may distribute routing information for this purpose. For example, route and interface manager 312-1 may communicate with network interfaces included within the network element using internal network 320. External routing protocol 314 may operate to facilitate external routing between the network element and external network nodes and may collect and maintain routing information for this purpose. For example, external routing protocol 314 may generate a routing table for a physical network of which the network element is a part. External routing protocol 314 may communicate via neighbor network element using external port 212 (see FIG. 2). Network stack 310-1 may represent a network stack that receives and forwards packets, performs routing lookup using forwarding tables, routes packets to destinations, and terminates packets, among other functionality. Examples of network protocols implemented by network stack 310-1 include Internet-protocol version 4, Internet-protocol version 6, and Open Systems Interconnection (OSI) protocols. L2 protocol 308-1 may represent an instance of OSI level 2 protocol, such as, for example, Ethernet or Point-to-Point Protocol PPP, among others. L2 protocol 308-1 may access internal hardware (HW) drivers 317-1 using a first protocol for communication with internal elements via internal network 320, and may access external nodes, such as neighboring node network elements (not shown) using a second protocol via external HW drivers 316-1. The first protocol and the second protocol used by L2 protocol 308-1 may be different protocols or may be the same protocol. Also, internal HW drivers 317-1 may represent functionality to interface with internal physical network ports (not shown) represented by internal network 320 for enabling internal communication among processor 208 and processor(s) 214. Internal network 320 may represent internal networking components, such as ports, switches, interconnection fabric, etc. within the network element. In certain embodiments, internal network 320 may include a link node handler (not shown) for setup and operation without a network stack.

In network architecture 301, at least one additional instance of a network stack in a network interface of the network element, namely network stack 310-2, may be implemented, along with route and interface manager 312-2, L2 protocol 308-2, internal HW drivers 317-2, and external HW drivers 316-2. It is noted that further additional instances of network stacks may be implemented in additional instances of network interfaces included in the network element.

In operation of network architecture 300 and network architecture 301 for preservation of a time-to-live (TTL) parameter in network element 102, when an IP packet is received at a network stack, referred to herein as an "ingress IP stack", the ingress IP stack may perform a route lookup based on a topology of network 100 in proximity to network element 102 and including network element 102. The route lookup may involve accessing a routing table or a routing database to determine a next node to forward the IP packet to or determine a forwarding route for the IP packet. In particular embodiments, the ingress IP stack is executed by network element processor 208. In some embodiments, the ingress IP stack is executed by network interface processor 214.

When the IP packet forwarding route includes internal network 320, the IP packet may be forwarded to another IP stack implemented within network element 102 from the ingress IP stack. However, in this case, the value of the TTL parameter in the IP is not decremented for the hop to internal network 320. In given embodiments, the IP packet may be specially marked with an indication of internal forwarding within network element 102, for example, by using a predetermined field in the IP packet. In various embodiments, the indication of internal forwarding includes setting a given bit, such as bit number 0, in a flag field in an IP header of the IP packet.

When the indication of internal forwarding is received by a subsequent IP stack, the subsequent IP stack may determine, for example, based on the route lookup, whether the subsequent IP stack is sending the IP packet externally out from network element 102, which is referred to herein as an "egress IP stack". When the subsequent IP stack is an egress IP stack, the egress IP stack may decrement the value of the TTL parameter in the IP packet and remove the indication of internal forwarding before sending out the IP packet. In some embodiments, the egress IP stack may reset or clear the given bit in the flag field of the IP header of the IP packet to remove the indication of internal forwarding. In this manner, infinite routing loops within network element 102 may be prevented due to the proper decrementing of the value of the TTL parameter by the egress IP stack. In particular embodiments, the subsequent IP stack is executed by network element processor 208. In some embodiments, the subsequent IP stack is executed by network interface processor 214. In particular embodiments, the egress IP stack is executed by network element processor 208. In some embodiments, the egress IP stack is executed by network interface processor 214.

When the subsequent IP stack is not an egress IP stack, such as when the IP packet is forwarded more than once within network element 102, the subsequent IP stack may leave both the indication of internal forwarding and the value of the TTL parameter unchanged in the IP packet and may forward the IP packet to another subsequent IP stack within network element 102.

Additionally, in operation of network architecture 300 and 301 for preservation of a time-to-live (TTL) parameter in network element 102, network element 102 may receive IP packets that are intended to illicit a response from network element 102, such as network diagnostic packets, for example, from trace route. In this case, the ingress IP stack receiving a diagnostic IP packet, for example, may check whether an internal IP address for the network element is used in a response packet generated to respond to the diagnostic IP packet. When the internal IP address is used in the response packet, the ingress IP stack may replace the internal IP address in the response packet with an external IP address for network element 102. The external IP address may be a public address that is routable in network 102 and enables external entities to properly perform network diagnostic operations that involve network element 102. For example, when the diagnostic IP packet is a trace route packet, the response packet may be an ICMP time exceeded packet.

In this manner, in accordance with embodiments of the present disclosure, network element 102 may be prevented from responding to diagnostic IP packets with an internal IP address in the corresponding response packets. The internal IP address may be a private or local IP address for network element 102, such as an IP address associated with internal network 320, that is not routable in network 100. Accordingly, in particular embodiments of the present disclosure for preservation of a time-to-live (TTL) parameter in network element 102, when network element 102 is not the destination of the diagnostic IP packet, but receives the diagnostic IP packet as an intermediate node in an IP forwarding route for the diagnostic IP packet, the diagnostic IP packet may not be improperly consumed within network element 102 and external entities sending the diagnostic IP packet to network element 102 may observe a desired and expected behavior from network element 102.

Figure 4:
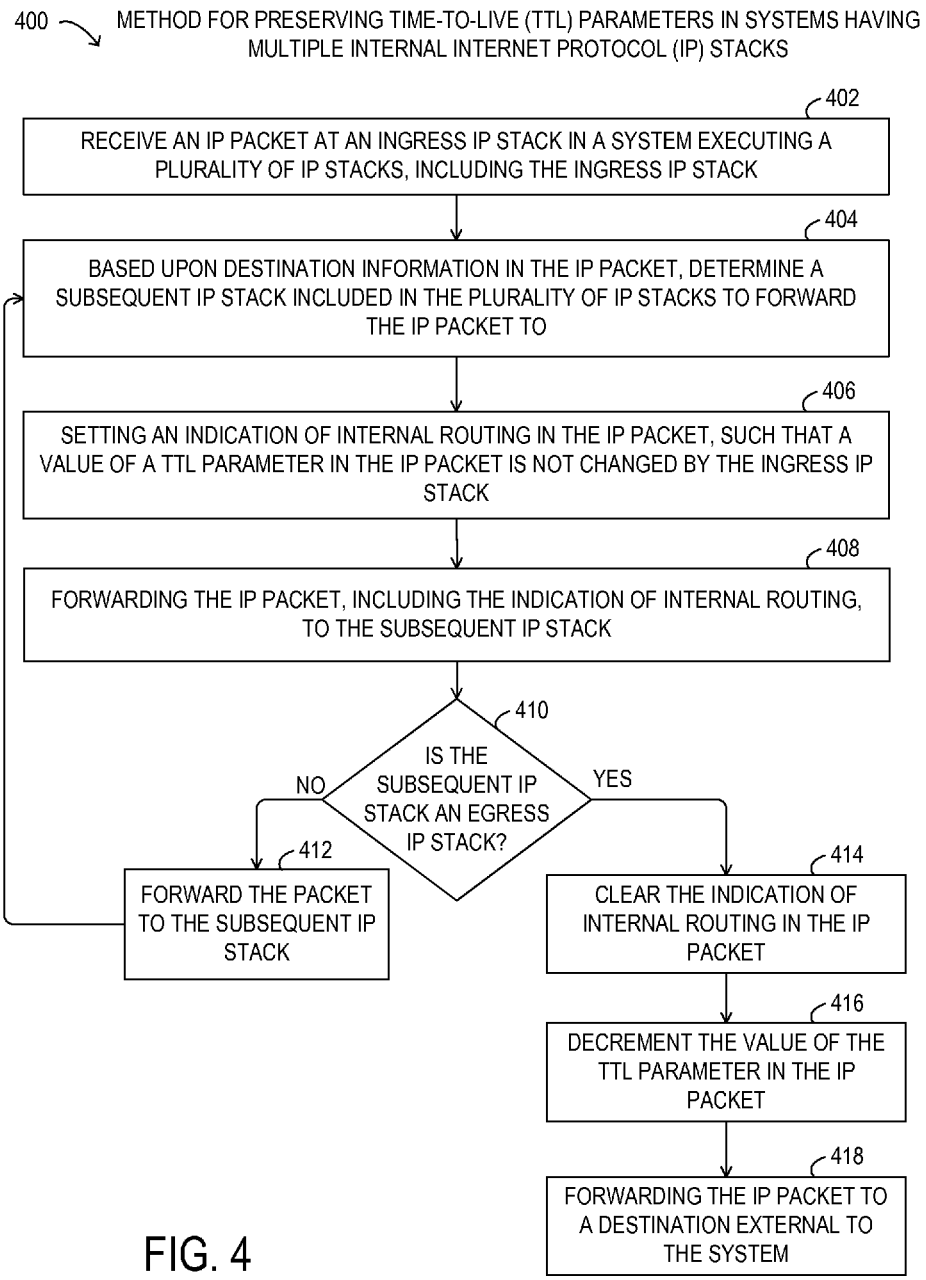
FIG. 4 is a flowchart depicting selected elements of a method for preserving time-to-live (TTL) parameters, in accordance with some embodiments of the present disclosure.

Referring now to FIG. 4, a block diagram of selected elements of an embodiment of method 400 for preserving time-to-live (TTL) parameters in systems having multiple internal Internet protocol (IP) stacks, as described herein, is depicted in flowchart form. In one embodiment, method 400 may be performed by network element 102 It is noted that certain operations described in method 400 may be optional or may be rearranged in different embodiments.

Method 400 may begin by receiving (operation 402) an IP packet at an ingress IP stack in a system executing a plurality of IP stacks, including the ingress IP stack. Based upon destination information in the IP packet, a subsequent IP stack included in the plurality of IP stacks may be determined (operation 404) to forward the IP packet to. Responsive to determining the subsequent IP stack, an indication of internal routing in the IP packet may be set (operation 406), such that a value of a TTL parameter in the IP packet is not changed by the ingress IP stack. The IP packet, including the indication of internal routing, may be forwarded (operation 408) to the subsequent IP stack. A determination may be made whether the subsequent IP stack is (operation 408) an egress IP stack in the system. When the result of operation 408 is NO, method 400 may include forwarding (operation 412) the IP packet to the subsequent IP stack. After operation 412, method 400 may loop back to operation 404, where a second subsequent IP stack may be determined when operation 404 is executed by the subsequent IP stack. When the result of operation 410 is YES, the indication of internal routing in the IP packet may be cleared (operation 414). The value of the TTL parameter in the IP packet may be decremented (operation 416). The IP packet may be forwarded (operation 418) to a destination external to the system.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A method for preserving time-to-live (TTL) parameters in systems having multiple internal Internet protocol (IP) stacks, the method comprising:
    receiving an trace route packet at an ingress IP stack in a system executing a plurality of IP stacks, including the ingress IP stack;
    based upon destination information in the trace route packet, determining a subsequent IP stack included in the plurality of IP stacks to forward the trace route packet to;
    responsive to determining the subsequent IP stack, setting an indication of internal routing in the trace route packet, wherein a value of a TTL parameter in the trace route packet is not changed by the ingress IP stack;
    generating a response packet to the trace route packet, wherein a public IP address for the network element is used as source information in the response packet;
    forwarding the trace route packet, including the indication of internal routing, to the subsequent IP stack;
    when the subsequent IP stack is an egress IP stack in the system:
        clearing the indication of internal routing in the trace route packet;
        decrementing the value of the TTL parameter in the trace route packet; and
        forwarding the trace route packet to a destination external to the system.

2. The method of claim 1, wherein determining the subsequent IP stack includes:
    performing a route lookup for the trace route packet based on destination information included in the trace route packet.

3. The method of claim 1, wherein the system is a network element.

4. The method of claim 3, wherein the ingress IP stack is executed by a network element processor and the subsequent IP stack is executed by a network interface processor.

5. The method of claim 3, wherein the ingress IP stack is executed by a first network interface processor and the subsequent IP stack is executed by a second network interface processor.

6. A network element for preserving time-to-live (TTL) parameters and having multiple internal Internet protocol (IP) stacks, the network element comprising:
    a first processor having access to a first memory media storing first instructions executable by the first processor;
    a second processor having access to a second memory media storing second instructions executable by the second processor;
    a first network port accessible to the first processor;
    a second network port accessible to the second processor; and
    an internal network accessible to the first processor and to the second processor,
    wherein the first instructions are executable by the first processor to implement an ingress IP stack, the first instructions further executable by the first processor to:
        receive a trace route packet at the first network port;
        based upon destination information in the trace route packet, determine that the trace route packet is to be forwarded to the second processor via the internal network;
        responsive to determining that the trace route packet is to be forwarded via the internal network, set an indication of internal routing in the trace route packet, wherein a value of a TTL parameter in the trace route packet is not changed;
        generate a response packet to the trace route packet, wherein a public IP address for the network element is used as source information in the response packet; and
        forward the trace route packet, including the indication of internal routing, to the second processor, wherein the second instructions are executable by the second processor to implement a subsequent IP stack, the second instructions further executable by the second processor to:
  receive the trace route packet; and
  when the subsequent IP stack is an egress IP stack in the network element for the trace route packet:
    clear the indication of internal routing in the trace route packet;
    decrement the value of the TTL parameter in the trace route packet; and
    forward the trace route packet at the second network port to a destination external to the network element.

7. The network element of claim 6, wherein the first instructions to determine that the trace route packet is to be forwarded to the second processor via the internal network include first instructions to:
  perform a route lookup for the trace route packet based on destination information included in the trace route packet.

8. The network element of claim 6, wherein the first processor is a network element processor and the second processor is a network interface processor.

9. The network element of claim 6, wherein the first processor is a first network interface processor and the second processor is a second network interface processor.

10. The network element of claim 6, wherein the second processor is a network element processor and the first processor is a network interface processor.

11. A network including a network element for preserving time-to-live (TTL) parameters and having multiple internal Internet protocol (IP) stacks, the network element comprising:
  a first processor having access to a first memory media storing first instructions executable by the first processor;
  a second processor having access to a second memory media storing second instructions executable by the second processor;
  a first network port accessible to the first processor;
  a second network port accessible to the second processor; and
  an internal network accessible to the first processor and to the second processor,
  wherein the first instructions are executable by the first processor to implement an ingress IP stack, the first instructions further executable by the first processor to:
    receive a trace route packet at the first network port;
    based upon destination information in the trace route packet, determine that the trace route packet is to be forwarded to the second processor via the internal network;
    responsive to determining that the trace route packet is to be forwarded via the internal network, set an indication of internal routing in the trace route packet, wherein a value of a TTL parameter in the trace route packet is not changed;
    generate a response packet to the trace route packet, wherein a public IP address for the network element is used as source information in the response packet; and
    forward the trace route packet, including the indication of internal routing, to the second processor,
  wherein the second instructions are executable by the second processor to implement a subsequent IP stack, the second instructions further executable by the second processor to:
    receive the trace route packet; and
    when the subsequent IP stack is an egress IP stack in the network element for the trace route packet:
      clear the indication of internal routing in the trace route packet;
      decrement the value of the TTL parameter in the trace route packet; and
      forward the trace route packet at the second network port to a destination external to the network element.

12. The network of claim 11, wherein the first instructions to determine that the trace route packet is to be forwarded to the second processor via the internal network include first instructions to:
  perform a route lookup for the trace route packet based on destination information included in the trace route packet.

13. The network of claim 11, wherein the first processor is a network element processor and the second processor is a network interface processor.

14. The network of claim 11, wherein the first processor is a first network interface processor and the second processor is a second network interface processor.

15. The network of claim 11, wherein the second processor is a network element processor and the first processor is a network interface processor.

* * * * *